(12) United States Patent
Nakamura et al.

(10) Patent No.: US 10,179,614 B2
(45) Date of Patent: Jan. 15, 2019

(54) REAR STRUCTURE OF VEHICLE

(71) Applicant: MAZDA MOTOR CORPORATION, Hiroshima (JP)

(72) Inventors: Yusuke Nakamura, Hiroshima (JP); Norihito Iwao, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 1 day.

(21) Appl. No.: 15/514,474

(22) PCT Filed: Oct. 20, 2016

(86) PCT No.: PCT/JP2016/081094
§ 371 (c)(1),
(2) Date: Mar. 24, 2017

(87) PCT Pub. No.: WO2017/073451
PCT Pub. Date: May 4, 2017

(65) Prior Publication Data
US 2017/0274944 A1 Sep. 28, 2017

(30) Foreign Application Priority Data
Oct. 26, 2015 (JP) ................................. 2015-209764

(51) Int. Cl.
*B60N 99/00* (2006.01)
*B62D 37/02* (2006.01)
*B60Q 1/30* (2006.01)
*B62D 35/00* (2006.01)

(52) U.S. Cl.
CPC ............... *B62D 37/02* (2013.01); *B60Q 1/30* (2013.01); *B62D 35/007* (2013.01)

(58) Field of Classification Search
CPC ......... B62D 37/02; B62D 35/007; B60Q 1/30
See application file for complete search history.

(56) References Cited

U.S. PATENT DOCUMENTS

| 2007/0236045 | A1 | 10/2007 | Froeschle et al. |
| 2012/0262934 | A1* | 10/2012 | Disley .................. B60Q 1/0491 362/510 |
| 2014/0160739 | A1* | 6/2014 | Hiesl ...................... F21V 15/01 362/217.1 |
| 2015/0016131 | A1 | 1/2015 | Moessner |

OTHER PUBLICATIONS

International Search Report issued in PCT/JP2016/081094; dated Nov. 22, 2016.

* cited by examiner

*Primary Examiner* — Lori L Lyjak
(74) *Attorney, Agent, or Firm* — Studebaker & Bracket PC (57) ABSTRACT

A rear structure of a vehicle includes: a rear lamp (6) provided at rear (1R) of the vehicle; and a rectifying member (3) extending from a center in a vehicle width direction to an outer side in a right and left direction. The rectifying member (3) includes an outer part (32) positioned on an outside in the vehicle width direction and a central part (31) positioned on the center in the vehicle width direction. The outer part (32) partitions the rear lamp (6) in a vertical direction of the vehicle, and an upper surface of the central part (31) extends further toward an upper side of the vehicle than the rear lamp (6) in the vehicle width direction.

8 Claims, 10 Drawing Sheets

REAR STRUCTURE OF VEHICLE

TECHNICAL FIELD

The invention relates to a rear structure of a vehicle provided with a rear lamp of the vehicle and a rectifying member, such as a rear spoiler, extending from a center in a vehicle width direction to an outer side in a right and left direction.

BACKGROUND ART

There is a case that a rear spoiler is provided at the rear of a vehicle. Generally, such a rear spoiler is, like the rear structure of a vehicle exemplified in Patent Literature 1, arranged on an upper surface at the rear of a vehicle in order to perform rectification at the time of traveling.

However, when a rear spoiler is arranged at a position at which a rear lamp such as a tail light is vertically partitioned in terms of realizing an intended fine view and the layouts of in-vehicle accessories, there is a problem in that aerodynamic performance cannot be secured since the entire rear spoiler is lowered. Accordingly, it is desired that this point be improved. Note that the above Patent Literature 1 does not seem to pay attention to such a problem and describe a specific configuration to achieve both the realization of an intended fine view and the securement of aerodynamic performance.

CITATION LIST

Patent Literature

Patent Literature 1: US Patent Application Publication No. 2015/0016131

SUMMARY OF INVENTION

The present invention has an object of realizing a design to arrange a rectifying member so as to vertically partition a rear lamp such as a tail light and achieving both the securement of design flexibility and the securement of aerodynamic performance.

Further, the present invention includes: a rear lamp provided at rear of a vehicle; and a rectifying member extending from a center in a vehicle width direction to an outer side in a right and left direction, wherein the rectifying member includes an outer part positioned on an outside in the vehicle width direction and a central part positioned on the center in the vehicle width direction, the outer part partitions the rear lamp in at least a vertical direction of the vehicle, and an upper surface of the central part extends further toward an upper side of the vehicle than the rear lamp in the vehicle width direction.

DESCRIPTION OF EMBODIMENTS

An embodiment of the invention will be described based on FIGS. 1 to 8 below. In the figures, an arrow F denotes the front side of a vehicle, an arrow LE denotes a left side in a vehicle width direction, and an arrow RI denotes a right side in the vehicle width direction.

As shown in FIGS. 1 to 6, rear lamp units 2 are installed on the respective right and left sides of rear 1R of the vehicle, and a rear spoiler 3 (corresponding to the rectifying member of the present invention) extending in the vehicle width direction is provided on the rear side of a pair of the right and left rear lamp units 2.

Figure 1:
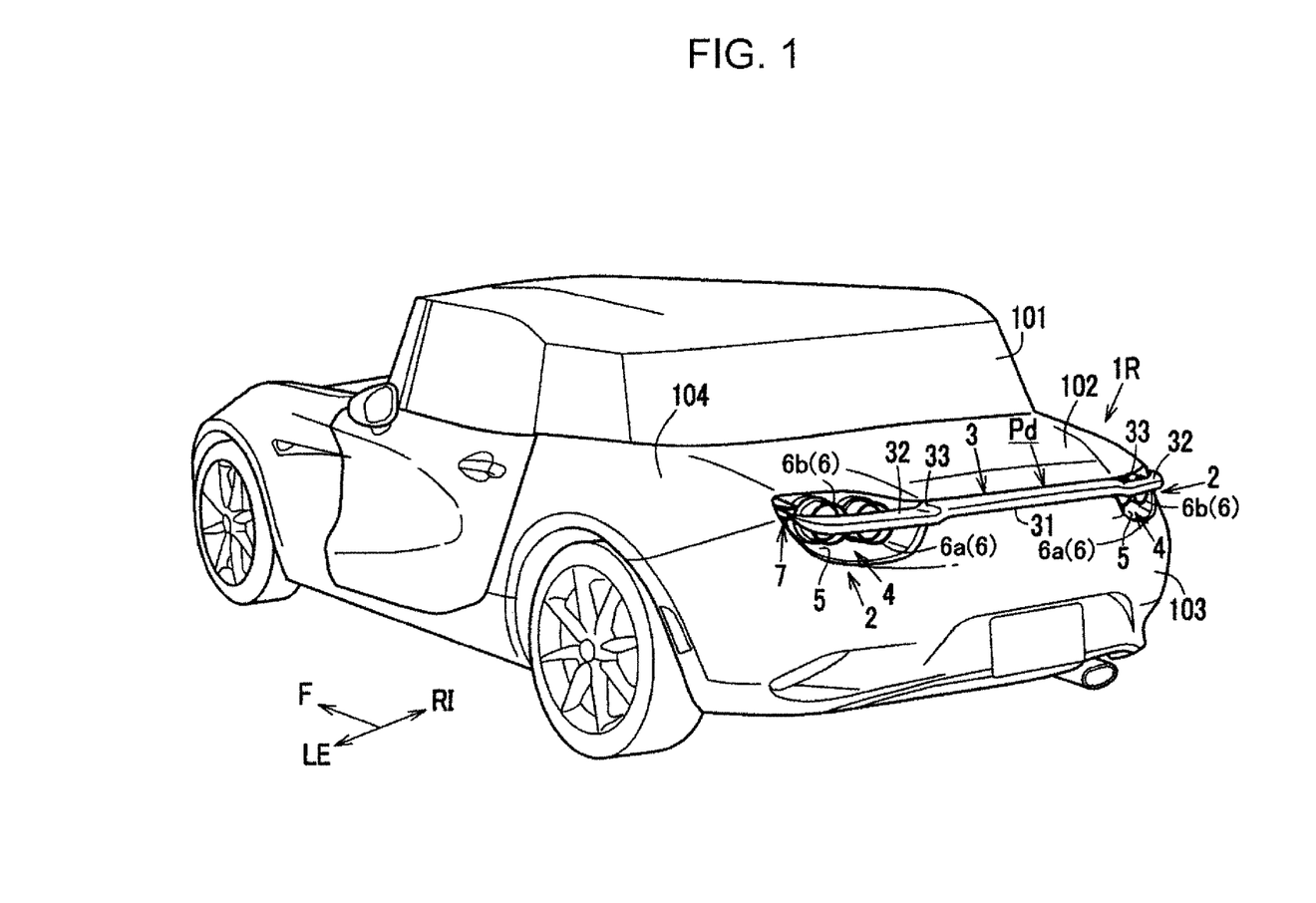
FIG. 1 is a perspective view where the rear of a vehicle according to an embodiment is seen from a rear side.

Note that in FIG. 1, symbol 101 denotes a back-window glass, symbol 102 denotes a rear deck panel, symbol 103 denotes a bumper face, and symbol 104 denotes a rear fender panel.

At the places of the rear 1R of the vehicle at which the rear lamp units 2 are be provided (at the respective right and left places of the rear 1R of the vehicle), recesses 4 where a vehicle body is recessed toward the front side of the vehicle are provided. The recesses 4 extend inward in the vehicle width direction from an outer end in the vehicle width direction when seen in a rear view, and are formed into a horizontally-oriented shape of which the length in the vehicle width direction is greater in size than the length in a vertical direction.

Note that at the rear 1R of the vehicle, a recessed part 45 having a length in the vertical direction shorter in size than those of the recesses 4 are provided so as to continuously connect the right and left rear lamp units 2, i.e., the upper parts of inner ends in the vehicle width direction of the right and left recesses 4 and 4 to each other. Thus, the rear 1R of the vehicle is designed so that the right and left rear lamp units 2 are connected to each other in the vehicle width direction via the recessed part 45 (see FIGS. 3 and 8).

As shown in FIGS. 2 to 7, the vehicle body corresponding to the places of both the right and left ends at the rear 1R of the vehicle at which the rear lamp units 2 are provided has extending edges 41 extending toward the front side, the extending edges 41 serving as the edges of the openings of the recesses 4.

Figure 6:
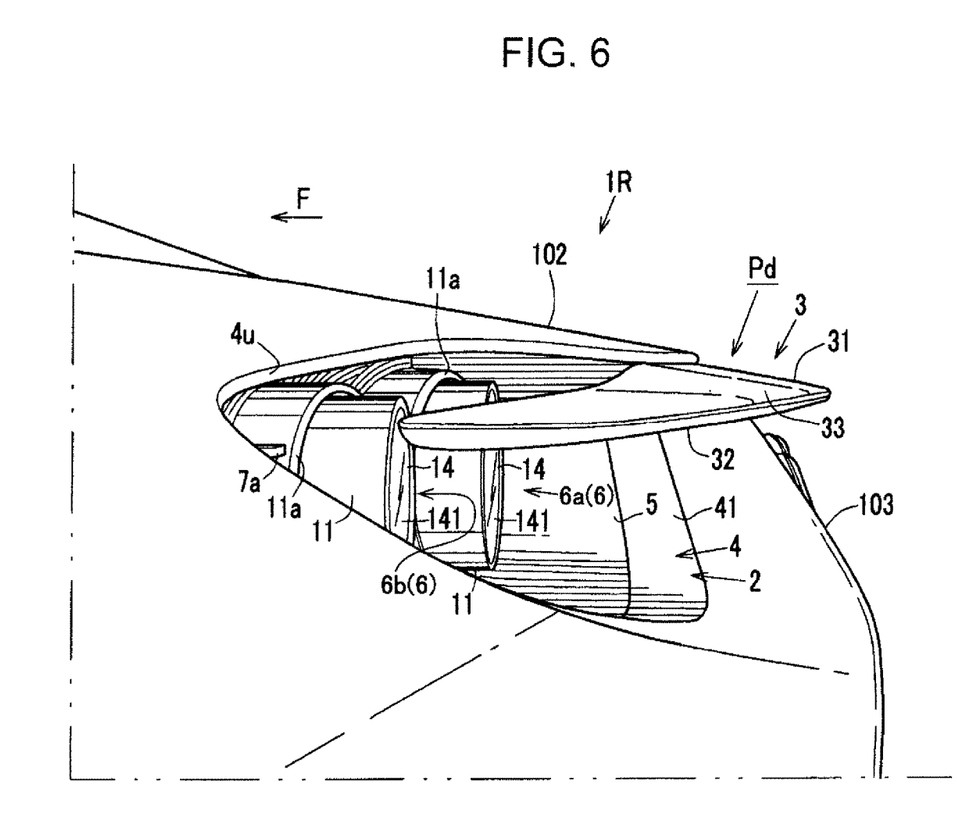
FIG. 6 is a substantial-part left side view of the rear of the vehicle when the spoiler takes the descending posture.
Figure 7:
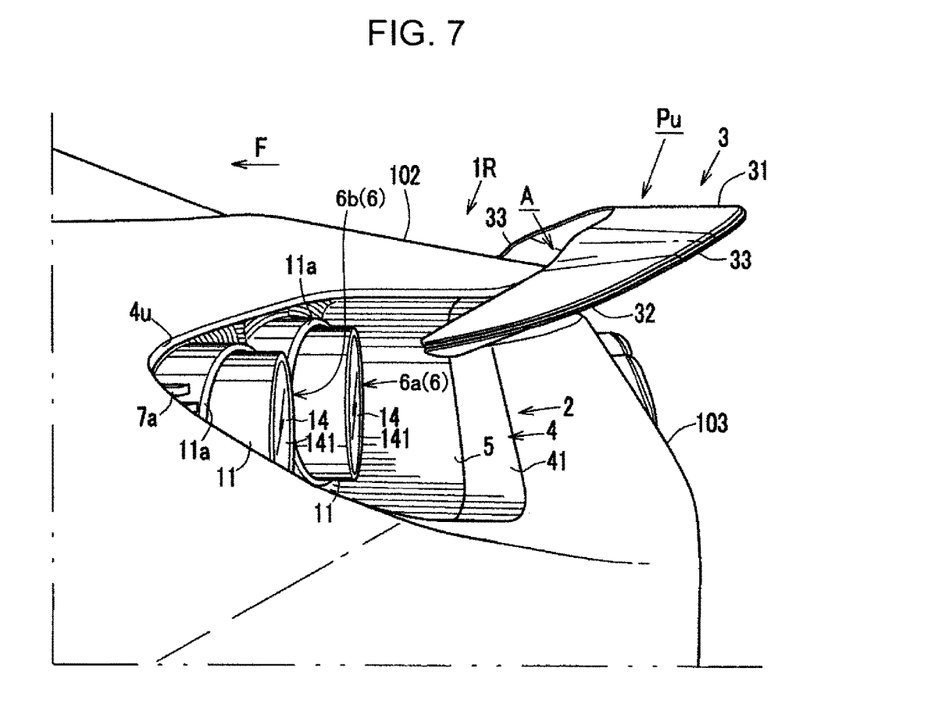
FIG. 7 is a substantial-part left side view of the rear of the vehicle when the spoiler takes the ascending posture.
Figure 8:
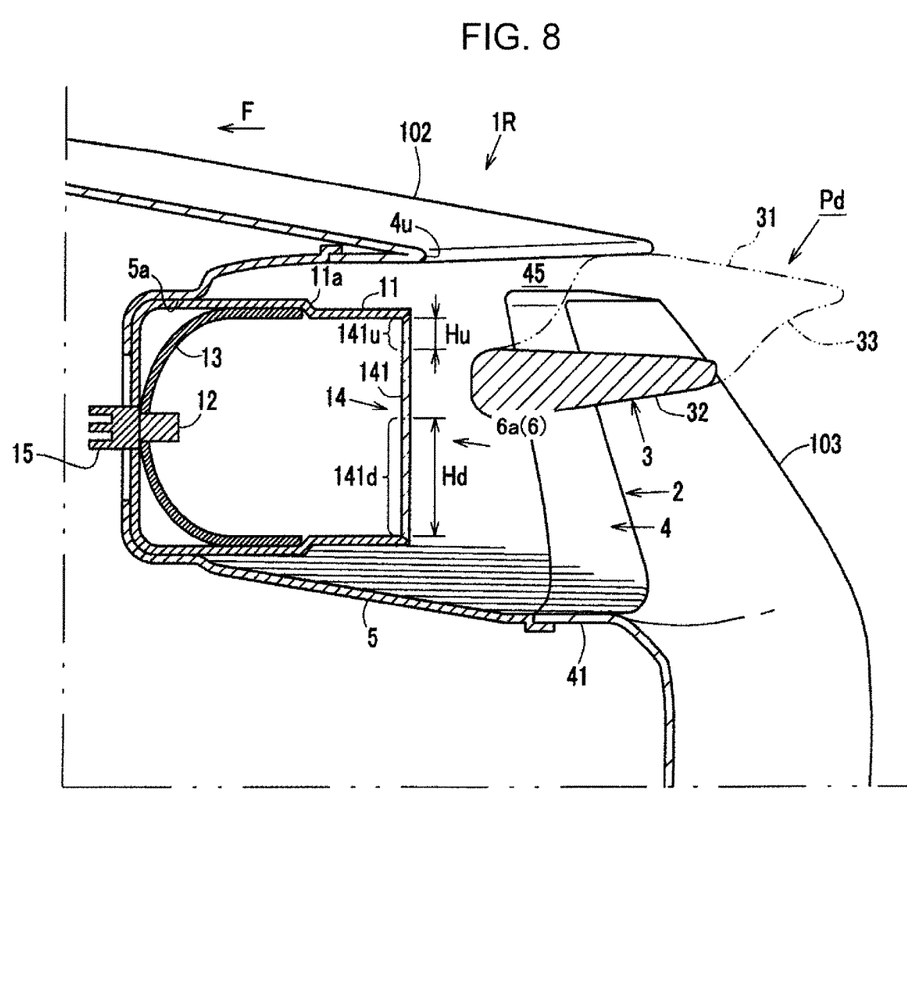
FIG. 8 is a cross-sectional schematic view of the rear of the vehicle showing the inner structure of a rear lamp unit.

As shown in FIGS. 1 to 8, the inner circumferential surfaces of the recesses 4 described above are substantially entirely made of resin bezels 5 provided in the rear lamp units 2. The bezels 5 are formed into a bottomed shape including an opening at its rear end. As shown in FIG. 8, the front edges of the bezels 5 are brought into contact with the extending edges 41 of the vehicle body. That is, the bezels 5 and the extending edges 41 form the smooth inner circumferential surfaces of the bottomed recesses 4 recessed toward the front side of the vehicle.

Note that the openings of the recesses 4 of the embodiment are not covered with lenses, transparent covers, or the like, and thus spaces inside the recesses 4 are in communication with a space outside the vehicle.

As shown in FIGS. 1 to 7, the rear lamp units 2 include two rear lamp light bodies 6 (6a and 6b) and a turn signal unit 7, the rear lamp light bodies 6 serving as lamp lights arranged side by side from the inside to the outside in the vehicle width direction of the recesses 4 so as to be stored in the recesses 4.

In the embodiment, the rear lamp light bodies 6 (inside rear lamp light bodies 6a) on the inside in the vehicle width direction are backlights (backup signal lights) that light when the vehicle retracts. The rear lamp light bodies 6 (outside rear lamp light bodies 6b) on the outside in the vehicle width direction are tail-and-stop lamps (tail lamps/stop signal lamps) that light when a switch, which is not shown in the figures, inside the vehicle is operated and that further powerfully light when a brake pedal (not shown in the figures) is pressed. The inside rear lamp light bodies 6a and the outside rear lamp light bodies 6b are provided in parallel with each other when seen in a plan view so that their lens surfaces 141 to be described later are oriented to the rear side of the vehicle.

Figure 2:
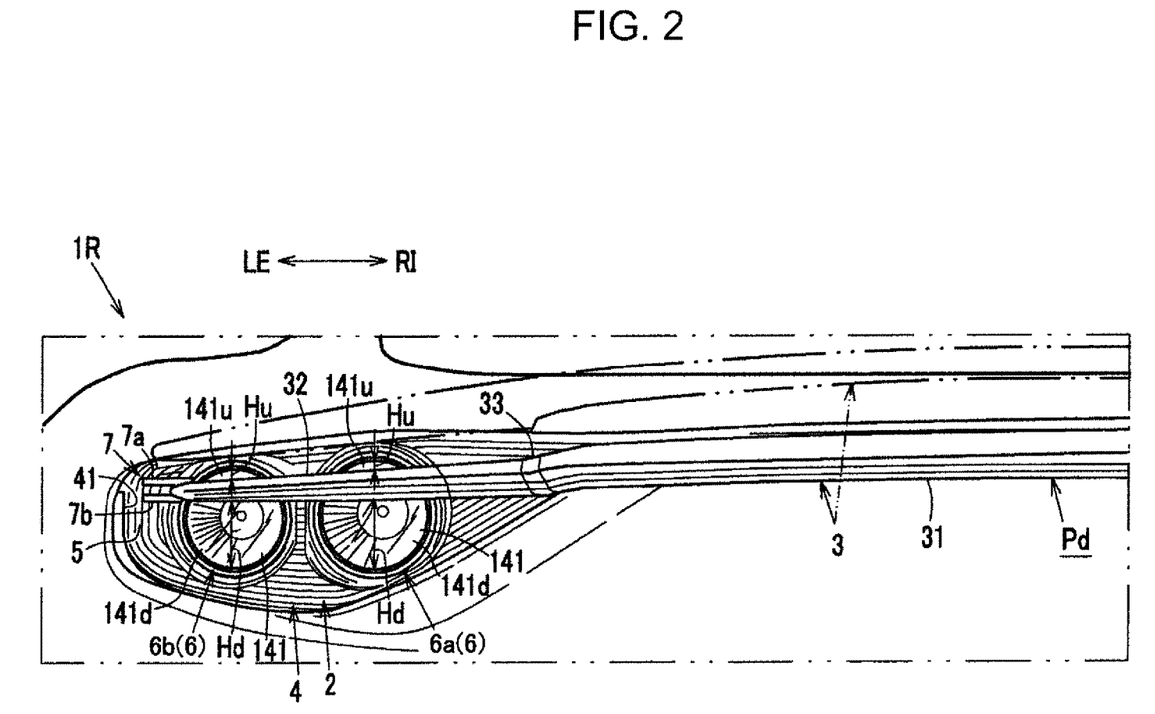
FIG. 2 is a substantial-part rear view of the rear of the vehicle when a spoiler takes a descending posture.
Figure 3:
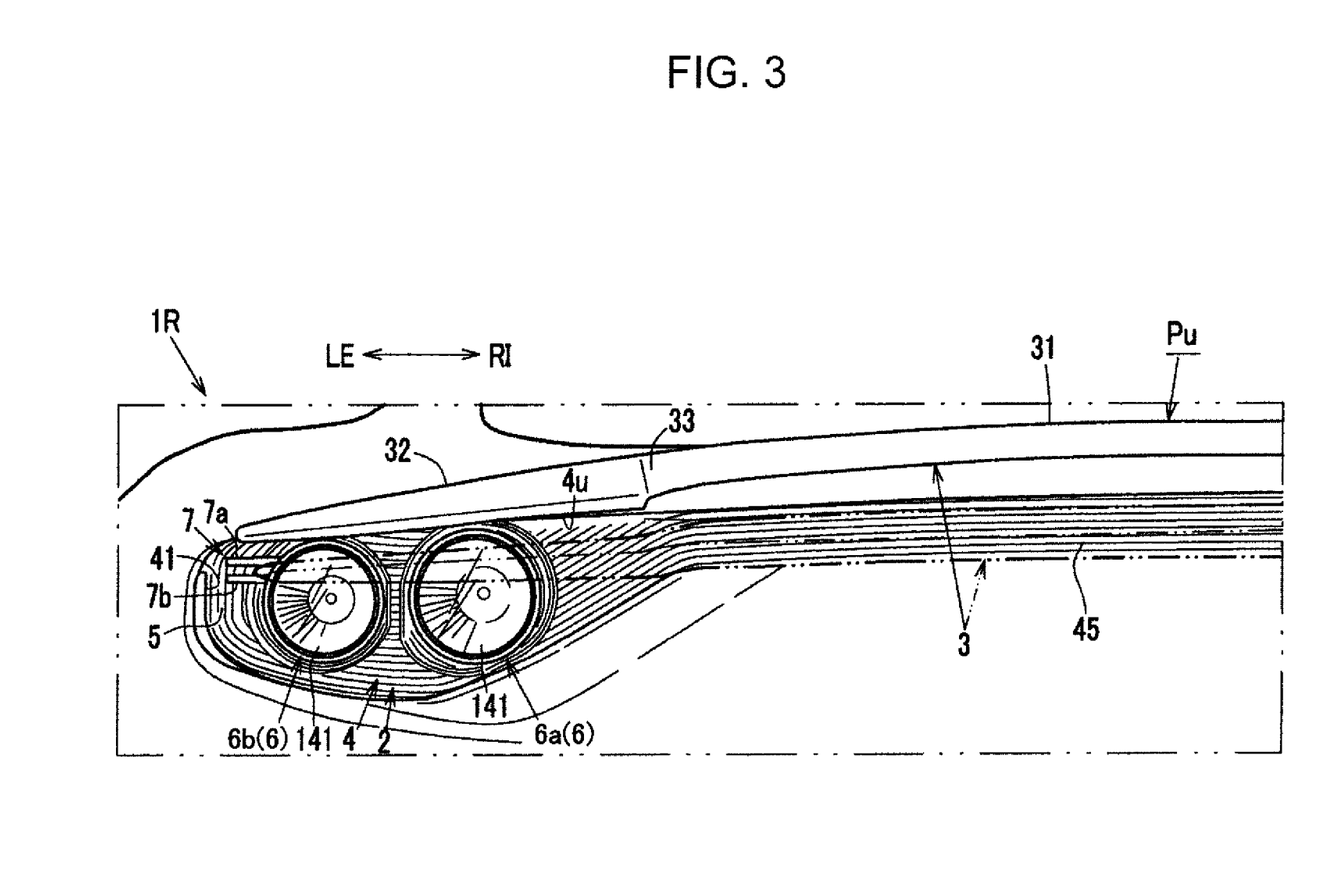
FIG. 3 is a substantial-part rear view of the rear of the vehicle when the spoiler takes an ascending posture.
Figure 4:
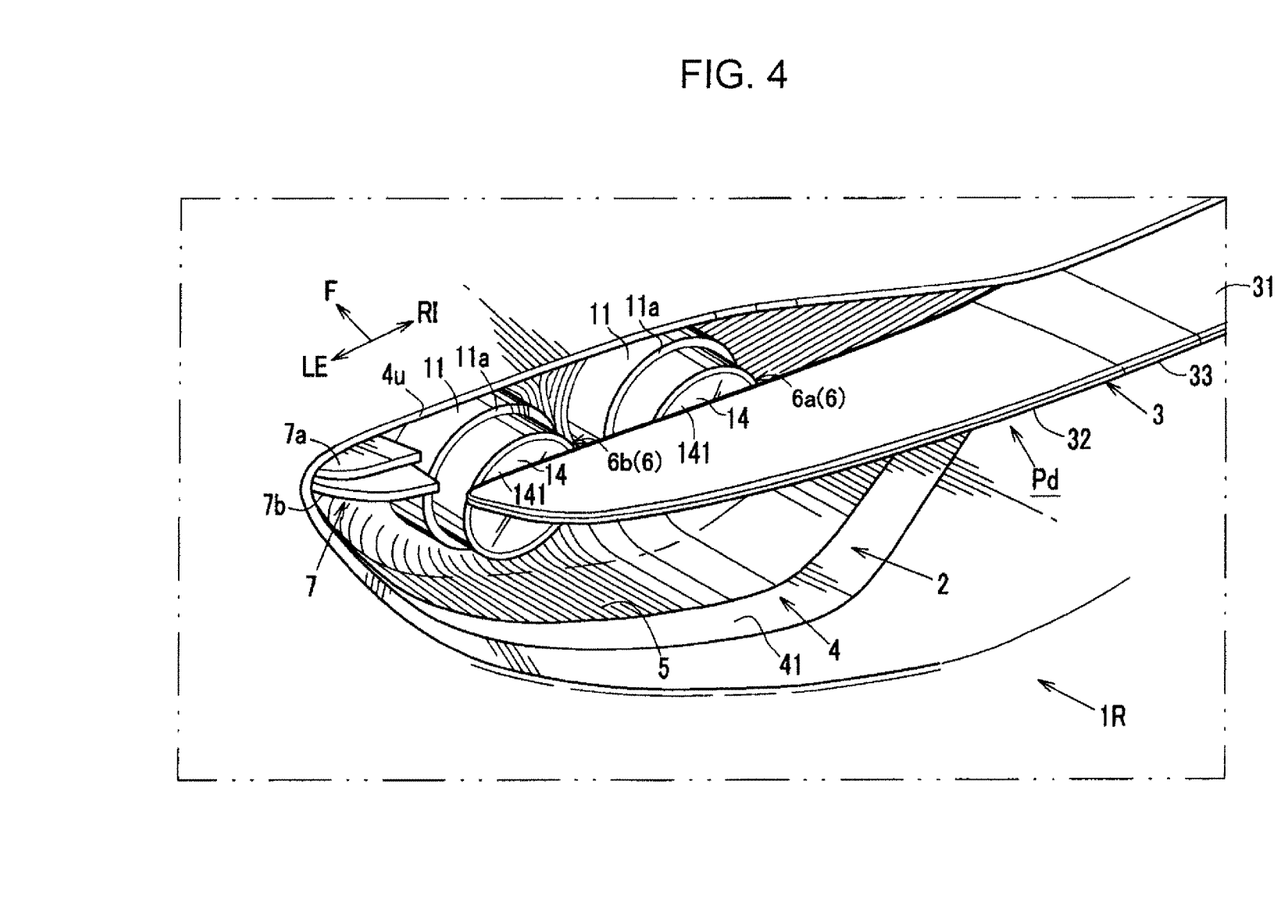
FIG. 4 is a perspective view where the left end of the rear side of the vehicle is seen from an upper side when the spoiler takes the descending posture.

Note that symbols 7a and 7b in FIGS. 2 to 4 denote fin-shaped light guiding plates provided as parts of the turn signal units 7 that guide light from turn-signal light sources, which are not shown in the figures, provided inside the rear lamp units 2 to blink when a turn signal lever is operated. The fin-shaped light guiding plates 7a and 7b are made of translucent members such as acrylic resins.

Next, the inner structure of the rear lamp light bodies 6 will be described. The right and left rear lamp units 2 are formed to be symmetrical, and the inside rear lamp light bodies 6a and the outside rear lamp light bodies 6b described above have substantially the same inner structure. Therefore, the inner structure of the rear lamp light bodies 6 will be described based on FIG. 8 schematically showing the vertical cross section of the inside rear lamp light body 6a of the left rear lamp unit 2. Note that FIG. 8 is an orthogonal cross-sectional view in the vehicle width direction obtained when the central part of the inside rear lamp light body 6a is cut off. Further, FIG. 8 shows a state in which the rear spoiler 3 takes a descending posture, and does not show inner structures at the rear of the vehicle other than the rear lamp unit.

The rear lamp light body 6 (6a) mainly includes a lighting case 11, a LED light source 12, a reflector 13, a lens 14, and a heat sink 15.

The lighting case 11 stores the reflector 13 and the LED light source 12, and is formed into a stepped cylindrical shape including a step 11a so as to make its rear have a diameter smaller in size than that of its front. In the embodiment, the lighting case 11 is attached to a recess 5a (see FIG. 8) formed at the bottom surface of the bezel 5 so that its central axis coincides with a front and rear direction.

The LED light source 12 is provided at the front end and the substantially central part when seen in a rear view of the rear lamp light body 6, and connected to a controller provided outside the rear lamp light body 6 (6a) via a harness or the like although not shown in the figures.

The reflector 13 is provided on the periphery of the LED light source 12, and formed into a substantially U-shape when seen in a side view so as to surround the edge of the LED light source 12 to reflect light emitted from the LED light source 12 toward the rear side of the vehicle.

The lens 14 is formed into a flat shape when seen in a cross-sectional view by a transparent synthetic resin, and attached so as to close an opening at the rear end of the lighting case 11.

The heat sink 15 is provided outside the rear lamp light body 6 and in front of the LED light source 12 so as to correspond to the LED light source 12, and has a function as a radiation unit that radiates heat emitted from the LED light source 12 to a surrounding area.

As shown in FIG. 1, the rear spoiler 3 is a resin-made plate-shaped member extending over a substantially entire length in the vehicle width direction at the rear 1R of the vehicle. As shown in FIGS. 1 to 7, the rear spoiler 3 integrally has a central part 31 positioned on a central side in the vehicle width direction, outer parts 32 positioned on both outer sides in the vehicle width direction than the central part 31 and positioned lower in height than the central part 31, and a coupling part 33 coupling these parts to each other, and is formed to be symmetrical. The rear spoiler 3 is formed into a plate shape elongated in the vehicle width direction as a whole, in which each of the central part 31, the coupling parts 33, and the outer parts 32 has a length in the front and rear direction greater in size than a thickness in a vertical direction. Such a rear spoiler 3 is configured to move between a descending posture Pd in which the rear spoiler 3 descends to a position at which the rear lamp light bodies 6 are partitioned in the vertical direction of the vehicle as shown in FIGS. 2, 4, and 6 and an ascending posture Pu in which the rear spoiler 3 ascends from the descending posture Pd as shown in FIGS. 3 and 7.

As shown in FIGS. 1, 2, 4, and 6, the outer parts 32 of the rear spoiler 3 extend in the vehicle width direction so as to reach outer ends in the vehicle width direction of the rear lamp units 2 across the rear lamp units 2 in a state in which the rear spoiler 3 takes the descending posture Pd.

Specifically, the outer parts 32 of the rear spoiler 3 extend so as to vertically partition (traverse) the lens surfaces 141 provided at the rear ends of the rear lamp light bodies 6 (the inside rear lamp light bodies 6a and the outside rear lamp light bodies 6b corresponding to the rear lamps of the present invention) when seen in a rear view (see FIGS. 1, 2, 4, and 6). Thus, the outer parts 32 of the rear spoiler 3 are arranged so that the lens surfaces 141 of the rear lamp light bodies 6, i.e., the blinking of the rear lamp light bodies 6 can be directly visually confirmed from both the upper and lower sides of the outer parts 32 (see FIGS. 2 and 4).

More specifically, the outer parts 32 of the rear spoiler 3 are arranged so that lower parts 141d of the lens surfaces 141 on the lower side of the outer parts 32 have a length Hd in the vertical direction greater in size than a length Hu of upper parts 141u thereof on the upper side of the outer parts 32 (Hd>Hu) when seen in a rear view (see FIGS. 2 and 8).

That is, as shown in FIG. 8, the outer parts 32 are arranged so as to vertically partition the lens surfaces 141 of the rear lamp light bodies 6 on the upper side of intermediate parts in the vertical direction of the lens surfaces 141 when seen in a rear view.

In addition, in a state in which the rear spoiler 3 is arranged to take the descending posture Pd, the outer parts 32 are arranged so as to face the lens surfaces 141 from the rear side in a state of getting in the inside of the openings of the recesses 4 when seen in a plan view (see FIGS. 6 and 8).

The outer parts 32 extend in the front and rear direction (i.e., the outer parts 32 have a length in the front and rear direction), but the lower parts 141d of the lens surfaces 141 of the rear lamp light bodies 6 on the lower side of the outer part 32 are arranged so as to be capable of being directly visually recognized when seen in a rear view (see FIG. 2).

Here, in a case different from the case of the embodiment in which the lens surfaces 141 are arranged so as to be oriented to the rear side of the vehicle, for example, in the case of a configuration (not shown in the figures) in which the lens 14 is arranged with an elevation angle so that the lens surfaces 141 are oriented to an obliquely upper side in a rear direction, the lower parts 141d of the lens surfaces 141 overlap with the outer parts 32 when seen in a plan view and may not be visually recognized from, for example, the obliquely upper side in the rear direction. However, since the lower parts 141d have a length in the vertical direction greater in size than the upper parts 141u with respect to the outer parts 32, the remaining lower parts 141d other than the above overlapped parts can be directly visually recognized from the obliquely upper side in the rear direction or an upward direction.

As shown in FIGS. 1, 2, and 3, the central part 31 of the rear spoiler 3 is positioned at a place corresponding to a substantially intermediate part between the pair of right and left rear lamp units 2 in the vehicle width direction, and at least the upper surface of the central part 31 extends in the vehicle width direction at a height above the lens surfaces 141 of the rear lamp light bodies 6 not only in the ascending posture Pu but also in the descending posture pd (see FIG. 2).

In addition, as shown in FIG. 6, the central part 31 of the rear spoiler 3 is positioned at the upper end of the bumper face 103 forming the rear surface of the rear 1R of the vehicle and arranged so as to protrude to the rear side from the rear end of the rear deck panel 102 in the descending posture Pd.

As shown in FIGS. 2 and 6, each of the upper surfaces of the central part 31 and the outer parts 32 of the rear spoiler 3 described above is formed into a smooth curved surface gradually inclined to the lower side so as to be lower toward the outside in the vehicle width direction and lower toward the rear side of the vehicle.

Figure 5:
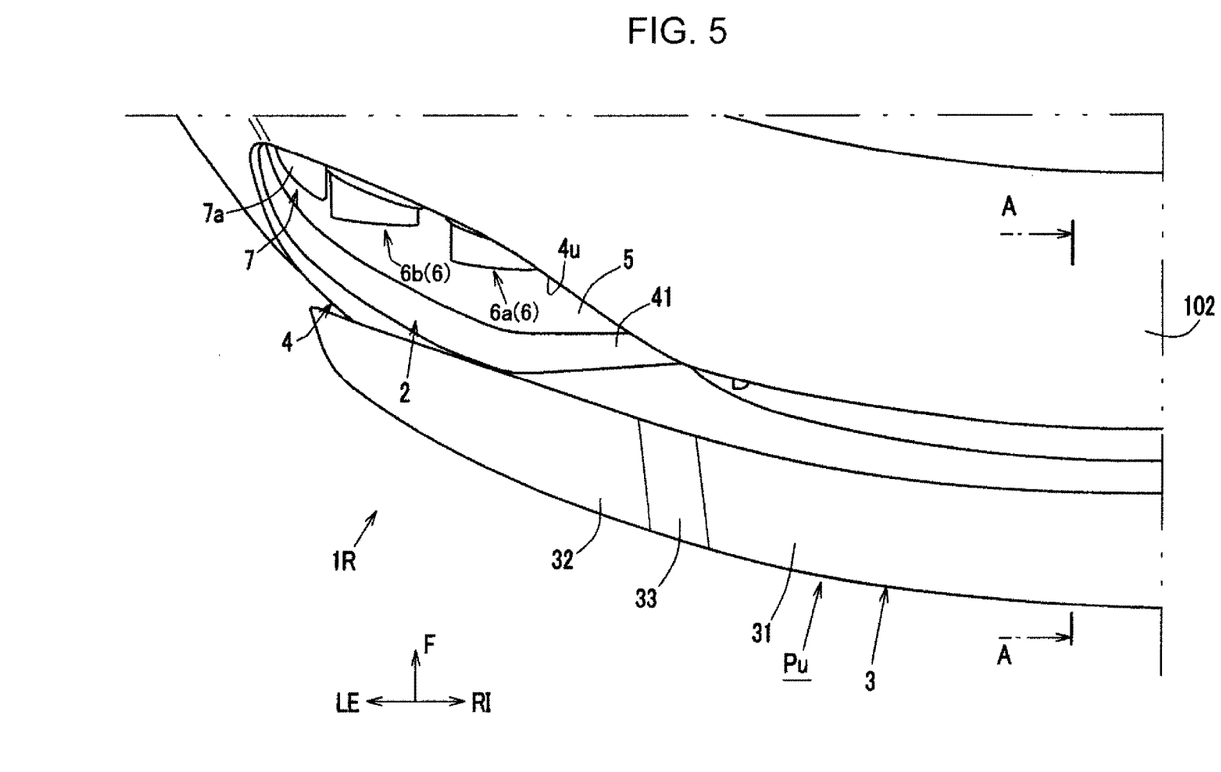
FIG. 5 is a substantial-part plan view of the rear of the vehicle when the spoiler takes the ascending posture.

Further, the coupling parts 33 are formed into a smooth stepped-shape inclined downward toward the outside in the vehicle width direction so as to couple the central part 31 and the outer parts 32 arranged at a position on an outer side in the vehicle width direction lower in height than the central part 31 to each other (see FIGS. 1, 2, and 6), and inclined so as to be gradually positioned on an inner side in the vehicle width direction toward the rear side (see FIGS. 4 to 6).

Figure 9:
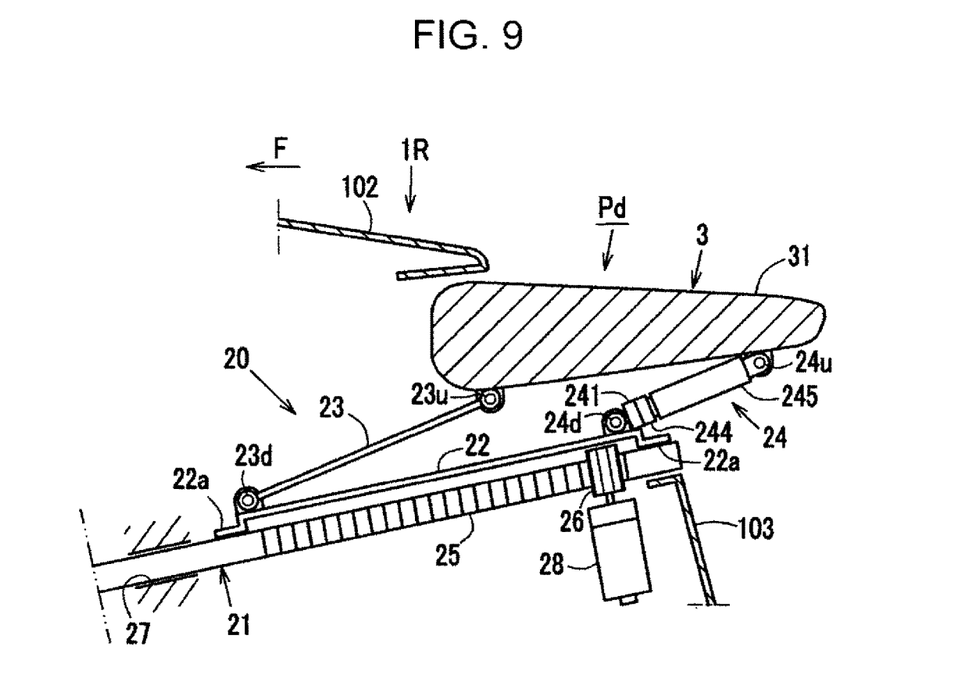
FIG. 9 is a view showing the driving support mechanism of the spoiler (when the spoiler takes the descending posture).
Figure 10:
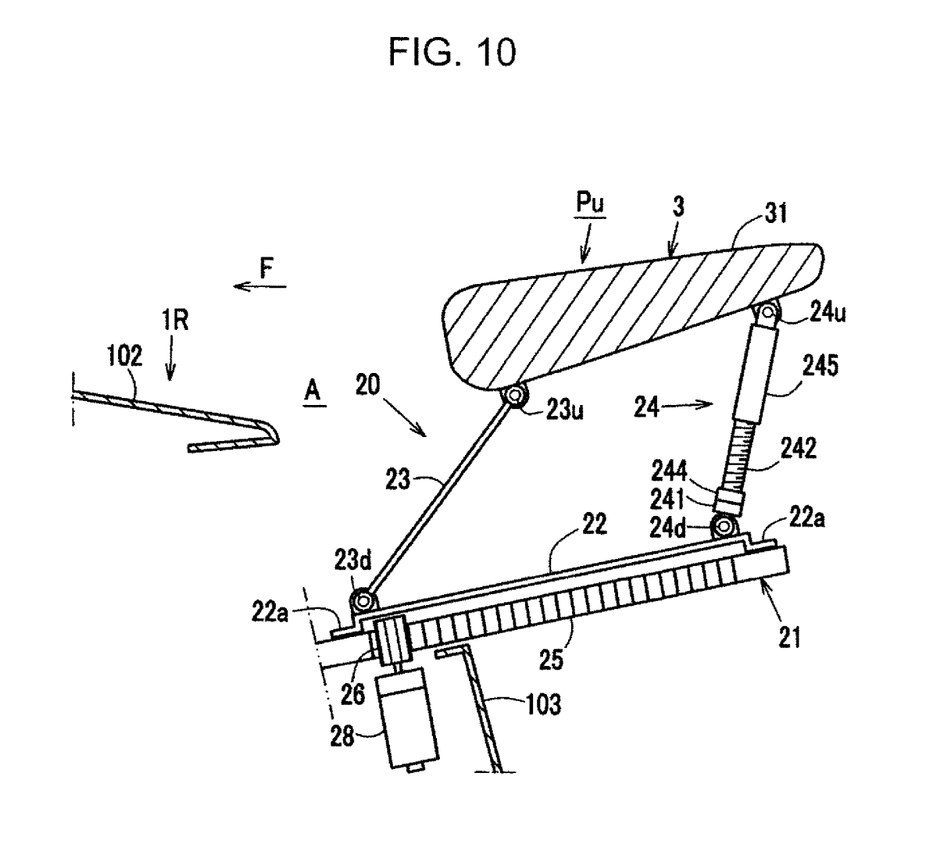
FIG. 10 is a schematic view showing the driving support mechanism of the spoiler (when the spoiler takes the ascending posture).

As shown in FIGS. 9 and 10, the rear spoiler 3 described above is supported by a driving support mechanism 20 (corresponding to the driving mechanism of the present invention) so as to be changeable to any of the descending posture Pd and the ascending posture Pu.

The driving support mechanism 20 is substantially entirely incorporated into the central part 31 in the vehicle width direction at the rear 1R of the vehicle, and supports the central part 31 of the rear spoiler 3 from below so that the rear spoiler 3 changes between the descending posture Pd and the ascending posture Pu.

A description will be given of an embodiment of the driving support mechanism 20 with reference to schematic views shown in FIGS. 9 and 10. The driving support mechanism 20 mainly includes a base board 21, an arm attachment bracket 22, a support arm 23, and an expansion/contraction support arm 24.

Note that FIG. 9 is a configuration explanation view schematically showing the driving support mechanism in a cross section taken along line A-A in FIG. 5, and FIGS. 9 and 10 are a cross-sectional view where the rear spoiler takes the descending posture and a cross-sectional view where the rear spoiler takes the ascending posture, respectively. However, in the figures, structures inside the vehicle body other than the driving support mechanism are not shown. Further, the support arm 23 and the expansion/contraction support arm 24 are provided in pairs on both right and left sides of a central part in the vehicle width direction at the rear 1R of the vehicle, and thus the rear spoiler 3 is supported by the four support arms 23 and 24 in total. However, in FIGS. 9 and 10, only the support arm 23 and the expansion/contraction support arm 24 on one of both the right and left sides in the vehicle width direction are shown.

The vehicle body is provided with a guide member 27 (see FIG. 9), and the base board 21 made of a plate-shaped member is slidably supported by the guide member 27 (see FIG. 9) so as to protrude or retract to the rear side with respect to the rear 1R of the vehicle.

The base board 21 is provided with a rack 25 along its sliding direction, and the vehicle body is provided with a pinion 26 that meshes with the rack 25 and a base-board sliding motor 28 that rotates and drives the pinion 26. Thus, the base board 21 is driven.

The arm attachment bracket 22 has rigidity with which the support arm 23 and the expansion/contraction support arm 24 can be supported, and is integrally fastened to the upper surface of the base board 21 via a flange 22a formed at its outer end.

The expansion/contraction support arm 24 includes an arm expansion/contraction motor 241, a screw shaft 242 (see FIG. 10), a boss 244 (coupling) that is interposed between the arm expansion/contraction motor 241 and the screw shaft 242 and transmits the driving force of the arm expansion/contraction motor 241 to the screw shaft 242, and a nut member 245 screwed with the rotation of the screw shaft 242.

The support arm 23 is a driven link that rotates in conjunction with the rotation of the expansion/contraction support arm 24 serving as a main driving link.

The support arm 23 and the expansion/contraction support arm 24 are coupled at their upper ends to the respective front and rear of the lower surface of the rear spoiler 3 via pivotally-attached parts 23u and 24u, respectively. That is, the expansion/contraction support arm 24 is coupled to the lower surface of the rear spoiler 3 at the upper end of the nut member 245.

On the other hand, the support arm 23 and the expansion/contraction support arm 24 are coupled at their lower ends to the respective front and rear of the attachment bracket via pivotally-attached parts 23d and 24d, respectively. Thus, the support arm 23 and the expansion/contraction support arm 24 are coupled to the base board 21 via the arm attachment bracket 22.

When the rear spoiler 3 is caused to move from the descending posture Pd shown in FIG. 9 to the ascending posture Pu shown in FIG. 10 by the driving support mechanism 20 described above, the pinion 26 is rotated by the driving of the base-board sliding motor 28 and the base board 21 is moved straight from the rear 1R of the vehicle to an outside rearward by the pinion 26 and the rack 25. Thus, the rear spoiler 3 separates from the recesses 4 to the rear side of the vehicle.

After that, the nut member 245 moves straight when the screw shaft 242 is rotated by the driving of the arm expansion/contraction motor 241, and thus the expansion/contraction support arm 24 expands. By the expansion of the expansion/contraction support arm 24, the support arm 23 and the expansion/contraction support arm 24 rotate counterclockwise when seen in a left view so as to rise with respect to the base board 21 in conjunction with each other and push up the rear spoiler 3 from beneath. Thus, the rear spoiler 3 moves to the ascending posture Pu while moving to the upper side of the vehicle (see FIG. 7).

Here, with attention paid to the outer parts 32 of the rear spoiler 3, the outer parts 32 move so as to separate from the recesses 4 to the rear and upper sides as the rear spoiler 3 moves from the descending posture Pd to the ascending posture Pu.

That is, the outer parts 32, which have been arranged at the height at which the rear lamp light bodies 6 are vertically partitioned in a state in which the rear spoiler 3 takes the descending posture Pd as shown in FIGS. 2 and 6, are arranged at a position at which the outer parts 32 separate from upper edges 4u of the recesses 4 to the upper and rear sides as shown in FIGS. 2 and 7 in a state in which the rear spoiler 3 takes the ascending posture Pu.

In other words, the outer parts 32 are arranged on the upper side of the rear lamp light bodies 6 in the ascending posture Pu. That is, in the embodiment, the outer parts 32 are arranged above the upper end of the lens surfaces 141 of the rear lamp light bodies 6 in the ascending posture Pu (see FIG. 3).

On the other hand, with attention paid to the central part 31 of the rear spoiler 3, the central part 31 is arranged so as to extend from the rear end of the rear deck panel 102 and the upper end of the bumper face 103 to the rear side when seen in a side view in a state in which the rear spoiler takes the descending posture Pd (see FIG. 6), but arranged so as to separate from the rear deck panel 102 to the upper side and from the bumper face 103 to the rear side in a state in which the rear spoiler 3 takes the ascending posture Pu (see FIGS. 7 and 10). That is, a space A communicating in the front and rear direction is formed between the lower surface of the central part 31 of the rear spoiler 3 and the rear deck panel 102. Note that the central part 31 and the outer parts 32 of the rear spoiler 3 are inclined downward toward the front side of the vehicle in a state in which the rear spoiler 3 takes the ascending posture Pu (see FIG. 6).

Note that when the rear spoiler 3 is caused to move from the ascending posture Pu to the descending posture Pd, the operation of moving the rear spoiler 3 from the descending posture Pd to the ascending posture Pu described above is performed in the reverse direction. That is, the expansion/contraction support arm 24 is contracted to move to the lower side, and then the base board 21 is retracted into the inside of the rear 1R of the vehicle.

In the embodiment, the rear spoiler 3 is kept in the descending posture Pd when the vehicle is stopped, and caused to move to the ascending posture Pu when the driving support mechanism 20 described above is automatically driven as the vehicle travels. Note that the traveling and stop of the vehicle can be detected, for example, based on whether an accelerator pedal has been pressed, but the specific configuration of the detection means is not particularly limited.

The rear structure of the vehicle of the embodiment is provided with: the rear lamp light bodies 6 (6a and 6b) serving as rear lamps provided in the rear lamp units 2 provided at the rear 1R of the vehicle; and the rear spoiler 3 serving as a rectifying member extending from a center in the vehicle width direction to an outer side in a right and left direction. The outer parts 32 on the outside in the vehicle width direction of the rear spoiler 3 are formed to partition the rear lamp light bodies 6 in at least the vertical direction of the vehicle, and the central part 31 on the central side in the vehicle width direction thereof is formed to make at least its upper surface extend from the rear lamp light bodies 6 to the upper side of the vehicle.

According to the above configuration, since the central part 31 on the central side in the vehicle width direction of the rear spoiler 3 useful for improving aerodynamic performance is formed so that at least its upper surface extends from the rear lamp light bodies 6 to the upper side of the vehicle in a state in which the rear spoiler 3 takes the descending posture Pd, the aerodynamic performance can be secured.

On the other hand, since the outer parts 32 in the vehicle width direction of the rear spoiler 3 are formed to extend so as to partition the rear lamp light bodies 6 in the vertical direction of the vehicle, the securement of design flexibility in realizing an intended design and an improvement in a fine view can be achieved.

Therefore, according to the above configuration, aerodynamic performance can be secured at the central part 31 of the rear spoiler 3, while the rear spoiler 3 is arranged so as to vertically partition the rear lamp light bodies 6 with the outer parts 32. Thus, both the securement of design flexibility and the securement of aerodynamic performance can be achieved.

According to the embodiment of the invention, the driving support mechanism 20 is provided as a mechanism to drive the rear spoiler 3, and the driving support mechanism 20 moves the rear spoiler 3 to the upper side of the rear lamp light bodies 6 when the vehicle travels (see FIGS. 3 and 7).

According to the above configuration, by making the rear spoiler 3 take the ascending posture Pu when the vehicle travels and moving the outer parts 32 of the rear spoiler 3 to the upper side of the rear lamp light bodies 6, traveling wind flowing from the rear deck panel 102 or the rear fender panel 104 to the rear lamp light bodies 6 can be rectified. Therefore, aerodynamic performance at the outer parts 32 of the rear spoiler 3 can be improved when the vehicle travels.

In addition, by causing the driving support mechanism 20 to drive the rear spoiler 3 so as to move to the upper side of the rear lamp light bodies 6 when the vehicle travels, the trouble of moving the rear spoiler 3 can be saved and forgetting to move the rear spoiler 3 can be prevented. Therefore, aerodynamic performance at the outer parts 32 can be reliably improved.

Further, according to the embodiment of the invention, the coupling parts 33 of the rear spoiler 3 that couple the outer parts 32 and the central part 31 to each other are inclined so as to be positioned on the inner side in the vehicle width direction toward the rear side of the vehicle when seen in a plan view (see FIGS. 3 to 6).

According to the above configuration, the coupling parts 33 are inclined so as to be positioned on the inner side in the vehicle width direction toward the rear side of the vehicle when seen in a plan view. Therefore, when traveling wind is introduced from the space A between the central part 31 of the rear spoiler 3 and the vehicle body at the rear 1R of the vehicle in a state in which the rear spoiler 3 takes the ascending posture Pu, a length in the vehicle width direction of the vehicle front end of the central part 31 of the rear spoiler 3 can be made longer than a length in the vehicle width direction of the vehicle rear end thereof. Therefore, since it becomes possible to easily introduce much more traveling wind and easily take in traveling wind flowing near the coupling parts 33, negative pressure on the central side in the vehicle width direction can be more effectively reduced.

In addition, since the central part 31 of the rear spoiler 3 extends from the upper end of the bumper face 103 to the rear side even in a state in which the rear spoiler 3 takes the descending posture Pd (see FIGS. 3 and 5), traveling wind is caused to flow to the rear side to effectively improve aerodynamic performance. Furthermore, since the coupling parts 33 are inclined to be positioned on the inner side in the vehicle width direction toward the rear of the vehicle when seen in a plan view, the rear spoiler 3 can cause traveling wind to effectively flow to the rear side not only with the central part 31 but also with the coupling parts 33. Thus, aerodynamic performance can be further improved.

Further, according to the embodiment of the invention, the outer parts 32 are formed to be lower toward the outer side in the vehicle width direction or the rear side of the vehicle when seen in a rear view (the outer parts 32 are lowered toward the rear side of the vehicle) (see FIGS. 2, 6, and 8).

According to the above configuration, the upper surfaces of the outer parts 32 are shaped to be lower toward the outer side in the vehicle width direction or the rear side of the vehicle when seen in a rear view in the descending posture Pd. Therefore, even if ice and snow, rain water, dust, mud, or the like drops on the upper surfaces of the outer parts 32, their attachment, accumulation, or the like can be suppressed, whereby a reduction in the visibility of the rear lamp light bodies 6 can be suppressed.

The invention is not limited to only the configurations of the embodiment described above.

For example, the present invention is not limited to a configuration in which the two rear lamp light bodies 6 and the turn signal unit 7 are arranged side by side in a line in the recesses 4 formed to be recessed in the front direction of the vehicle at the rear 1R of the vehicle like the rear lamp units 2 of the embodiment, but the number of the rear lamp light bodies 6 may not be limited to two or the rear lamp units 2 may have a general configuration provided with a cover or a lens to form a part of the surface of the body, as generally employed for passenger vehicles.

Further, in the embodiment described above, the rear spoiler 3 is configured to change its posture between the descending posture Pd and the ascending posture Pu depending on whether the vehicle is stopped or traveling, but the invention is not limited to the configuration. For example, the rear spoiler 3 may automatically change the state from the descending posture Pd to the ascending posture Pu upon detecting the fact that a traveling speed has become a prescribed speed or more, i.e., the rear spoiler 3 may be configured to change the posture based on the statuses of the own vehicle. In addition, the rear spoiler 3 may be configured to detect statuses around the own vehicle such as the following vehicles and pedestrians or receive the same from infrastructures and then change the posture based on the statuses (for example, the rear spoiler 3 automatically changes from the descending posture Pd to the ascending posture Pu when it is determined that there is a need to notify the passengers of the following vehicles or pedestrians of the statuses of the own vehicle).

Further, in the embodiment, a driver may selectively change the posture between the descending posture Pd and the ascending posture Pu. In this case, the driver may be configured to be capable of arbitrarily changing the posture by, for example, operating a remote controller provided in the cabin of the vehicle or operating a switch provided on an instrument panel, a center console, or the like. Alternatively, a passenger may be configured to manually change the posture before the vehicle travels according to his/her preferences without installing a driving mechanism, i.e., the configuration of changing the posture is not particularly limited.

The present invention described above is summarized as follows.

A rear structure of a vehicle according to the invention includes: a rear lamp provided at rear of the vehicle; and a rectifying member extending from a center in a vehicle width direction to an outer side in a right and left direction, wherein the rectifying member includes an outer part positioned on an outside in the vehicle width direction and a central part positioned on the center in the vehicle width direction, the outer part partitions the rear lamp in at least a vertical direction of the vehicle, and an upper surface of the central part extends further toward an upper side of the vehicle than the rear lamp in the vehicle width direction.

According to the above configuration, even when the rectifying member is arranged so as to vertically partition the rear lamp, aerodynamic performance can be secured at a part other than a part of the rectifying member that partitions the rear lamp. Accordingly, both design flexibility and the securement of aerodynamic performance can be achieved.

In the above configuration, the rear structure of the vehicle preferably includes: a driving mechanism that drives the rectifying member, wherein the driving mechanism moves the rectifying member to the upper side of the rear lamp when the vehicle travels.

According to the above configuration, aerodynamic performance at the outer part of the rectifying member can be improved when the vehicle travels.

Further, in the above configuration, the rectifying member preferably further includes a coupling part that couples the outer part and the central part to each other, and the coupling part is preferably inclined so as to be positioned on an inner side toward a rear side of the vehicle in the vehicle width direction when seen in a plan view.

According to the above configuration, negative pressure on a central side in the vehicle width direction can be more effectively reduced.

Further, in the above configuration, the outer part is preferably formed to be lower toward the outer side in the vehicle width direction or the rear side of the vehicle when seen in a rear view.

According to the above configuration, a reduction in the visibility of the rear lamp due to the adhesion of snow, mud, or the like to the rectifying member can be suppressed.

INDUSTRIAL APPLICABILITY

As described above, the present invention is useful for the rear structure of a vehicle provided with the rear lamp of the vehicle and a rectifying member such as a rear spoiler extending from a center in a vehicle width direction to an outer side in a right and left direction.

The invention claimed is:

1. A rear structure of a vehicle comprising:
   a rear lamp provided at rear of the vehicle; and
   a rectifying member extending from a center in a vehicle width direction to an outer side in a right and left direction, wherein
   the rectifying member includes an outer part positioned on an outside in the vehicle width direction and a central part positioned on the center in the vehicle width direction,
   the outer part partitions the rear lamp in at least a vertical direction of the vehicle, and an upper surface of the central part extends further toward an upper side of the vehicle than the rear lamp in the vehicle width direction.

2. The rear structure of the vehicle according to claim 1, comprising:
a driving mechanism that drives the rectifying member, wherein
the driving mechanism moves the rectifying member to the upper side of the rear lamp when the vehicle travels.

3. The rear structure of the vehicle according to claim 1, wherein
the rectifying member further includes a coupling part that couples the outer part and the central part to each other, and
the coupling part is inclined so as to be positioned on an inner side toward a rear side of the vehicle in the vehicle width direction when seen in a plan view.

4. The rear structure of the vehicle according to claim 1, wherein
the outer part is formed to be lower toward the outer side in the vehicle width direction or the rear side of the vehicle when seen in a rear view.

5. The rear structure of the vehicle according to claim 2, wherein
the rectifying member further includes a coupling part that couples the outer part and the central part to each other, and
the coupling part is inclined so as to be positioned on an inner side toward a rear side of the vehicle in the vehicle width direction when seen in a plan view.

6. The rear structure of the vehicle according to claim 2, wherein
the outer part is formed to be lower toward the outer side in the vehicle width direction or the rear side of the vehicle when seen in a rear view.

7. The rear structure of the vehicle according to claim 3, wherein
the outer part is formed to be lower toward the outer side in the vehicle width direction or the rear side of the vehicle when seen in a rear view.

8. The rear structure of the vehicle according to claim 5, wherein
the outer part is formed to be lower toward the outer side in the vehicle width direction or the rear side of the vehicle when seen in a rear view.

* * * * *